(12) United States Patent
Hamrick et al.

(10) Patent No.: US 6,741,172 B1
(45) Date of Patent: May 25, 2004

(54) VOICE-TO-DATA EQUIPMENT INSTALLATION SET UP METHOD AND SYSTEM

(75) Inventors: Marvin R. Hamrick, Watkinsville, GA (US); Jerome R. Timko, Lilburn, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 58 days.

(21) Appl. No.: 10/184,254

(22) Filed: Jun. 28, 2002

(51) Int. Cl.[7] .............................................. G08B 29/00
(52) U.S. Cl. ..................... 340/514; 340/504; 340/506; 340/3.1; 379/265.02; 379/265.04; 379/265.11
(58) Field of Search ................................. 340/514, 504, 340/506, 3.1, 5.1, 7.23, 7.43, 7.45; 379/219, 265.11, 265.02, 265.04

(56) References Cited

U.S. PATENT DOCUMENTS

| | | | | |
|---|---|---|---|---|
| 4,993,017 A | * | 2/1991 | Bachinger et al. | 370/360 |
| 6,181,788 B1 | * | 1/2001 | Miloslavsky | 379/265 |
| 6,320,951 B1 | * | 11/2001 | Shtivelman et al. | 379/211.01 |
| 6,408,064 B1 | * | 6/2002 | Fedorov | 379/265.06 |

* cited by examiner

*Primary Examiner*—Daryl Pope
(74) *Attorney, Agent, or Firm*—Merchant & Gould

(57) ABSTRACT

A system and method are provided for transmitting equipment installation data between an equipment installer and an operations center server. An installer of equipment, such as a monitoring device attached to a vehicle, calls an operations center server via a wireless telecommunications device, such as a wireless telephone. The call placed by the equipment installer is transmitted to a transfer server. A voice-to-data software application at the transfer server converts the communication to data for transfer to the operations center server. The operations center server prompts the installer with a series of prompts to obtain equipment installation information. Prompts from the operations center server are transmitted in data to the transfer server where those prompts are converted to voice before being transmitted to the equipment installer's wireless telephone. The equipment installer responds to prompts from the operations center server with required installation information, such as equipment identification numbers, vehicle identification numbers, and the like. Once the desired equipment is installed in the vehicle or equipment item, other tests such as an alarm test may be performed.

23 Claims, 2 Drawing Sheets

VOICE-TO-DATA EQUIPMENT INSTALLATION SET UP METHOD AND SYSTEM

FIELD OF THE INVENTION

This invention relates to a system and method for transmitting equipment installation data between an equipment installer and an operations center server.

BACKGROUND OF THE INVENTION

Many businesses operate fleets of vehicles and equipment scattered across wide geographic areas for handling a variety of tasks, such as material delivery, construction, equipment installation and maintenance. For example, a large telecommunications service provider may operate a fleet of vehicles for traveling throughout a wide geographic area for installing wireline and wireless telecommunications systems. Often, operators of such fleets of vehicles and equipment install equipment items such as remote monitoring devices and alarm systems in each of the vehicles for transmitting data to a home operations center associated with the status of the vehicles or equipment. For example, a remote monitoring device may be used to transmit location data received from a global positioning satellite system, or an alarm system may be provided in a vehicle or equipment item to allow a user of the vehicle or equipment item to activate an alarm that is transmitted to the operations center if the operator is in distress.

In a typical setting, an installation person installs the remote monitoring device or alarm system in the vehicle or equipment item and then calls an operations center to provide the operations center with identification information associated with both the remote monitoring device and the vehicle or equipment item so that signaling received from the remote monitoring device is properly related to the vehicle or equipment item in which it is installed. Testing of the alarm system is necessary to ensure that the alarm system will be operational and available upon the need of a subsequent operator of the vehicle or equipment item. Typically, a person working in the remote operations center must receive the data from the equipment installer and load the information into a database at the remote operations center. Furthermore, when the installer tests the alarm system associated with the vehicle or equipment item, a person manning the operations center must detect the alarm signal, determine whether the alarm test is successful, and relay that information back to the equipment installer at the vehicle or equipment item. This process is time-consuming and requires that human operators work in the operations center around the clock to receive data from equipment installers and to test alarm systems.

Accordingly, there is a need for an automated system for allowing an equipment installer to provide installation data and to conduct alarm testing without the need for direct communication with personnel at an operations center. It is with respect to these and other considerations that the present invention has been made.

SUMMARY OF THE INVENTION

Embodiments of the present invention solve the above and other problems by providing a system and method for transmitting equipment installation data between an equipment installer and an operations center server. An installer of equipment, such as a monitoring device attached to a vehicle or other equipment item, for example a fleet of maintenance vehicles for maintaining equipment in a telecommunications system, calls an operations center server via a wireless telecommunications device, such as a wireless telephone. The call placed by the equipment installer is transmitted over a wireless telecommunications system to a transfer server. At the transfer server, a data link connection is established between the transfer server and the operations system server for transferring data received by the installer to the operations center server. A voice-to-data software application at the transfer server receives voice communication from the equipment installer and converts the communication to data for transfer to the operations center server.

Once a communications link is established with the operations center server, the server prompts the equipment installer with a series of prompts to obtain equipment installation information from the equipment installer. Prompts from the operations center server are transmitted in data over the data link to the transfer server where the prompts are converted to voice before being transmitted to the equipment installer's wireless telephone. The equipment installer responds to prompts from the operations center server with required installation information, such as equipment identification numbers, vehicle identification numbers, remote monitoring device identification numbers, and the like. The responses from the equipment installer are received by the transfer server and are converted to data before being transmitted to the operations center server.

Once the desired equipment is installed in the vehicle or equipment item, other tests such as an alarm test may be performed. An alarm system test may be performed by activating an alarm system at the vehicle or equipment item to transmit a wireless signal directly to the operations center server. If the operations center server detects the alarm test as a successful test, a response is forwarded back to the equipment installer via the transfer server to notify the equipment installer that the test was successful. On the other hand, if the test is not successful, a notification that the test is not successful is forwarded to the equipment installer.

These and other features and advantages, which characterize the present invention, will be apparent from a reading of the following detailed description and a review of the associated drawings. It is to be understood that both the foregoing general description and the following detailed description are exemplary and explanatory only, and are not restrictive of the invention, as claimed.

DETAILED DESCRIPTION

The following description of an embodiment of the present invention is made with reference to the above-described drawings wherein like numerals refer to like parts or components throughout the several figures. The present invention is directed to a system and method for transmitting equipment installation data between an equipment installer and an operations center server.

Figure 1:
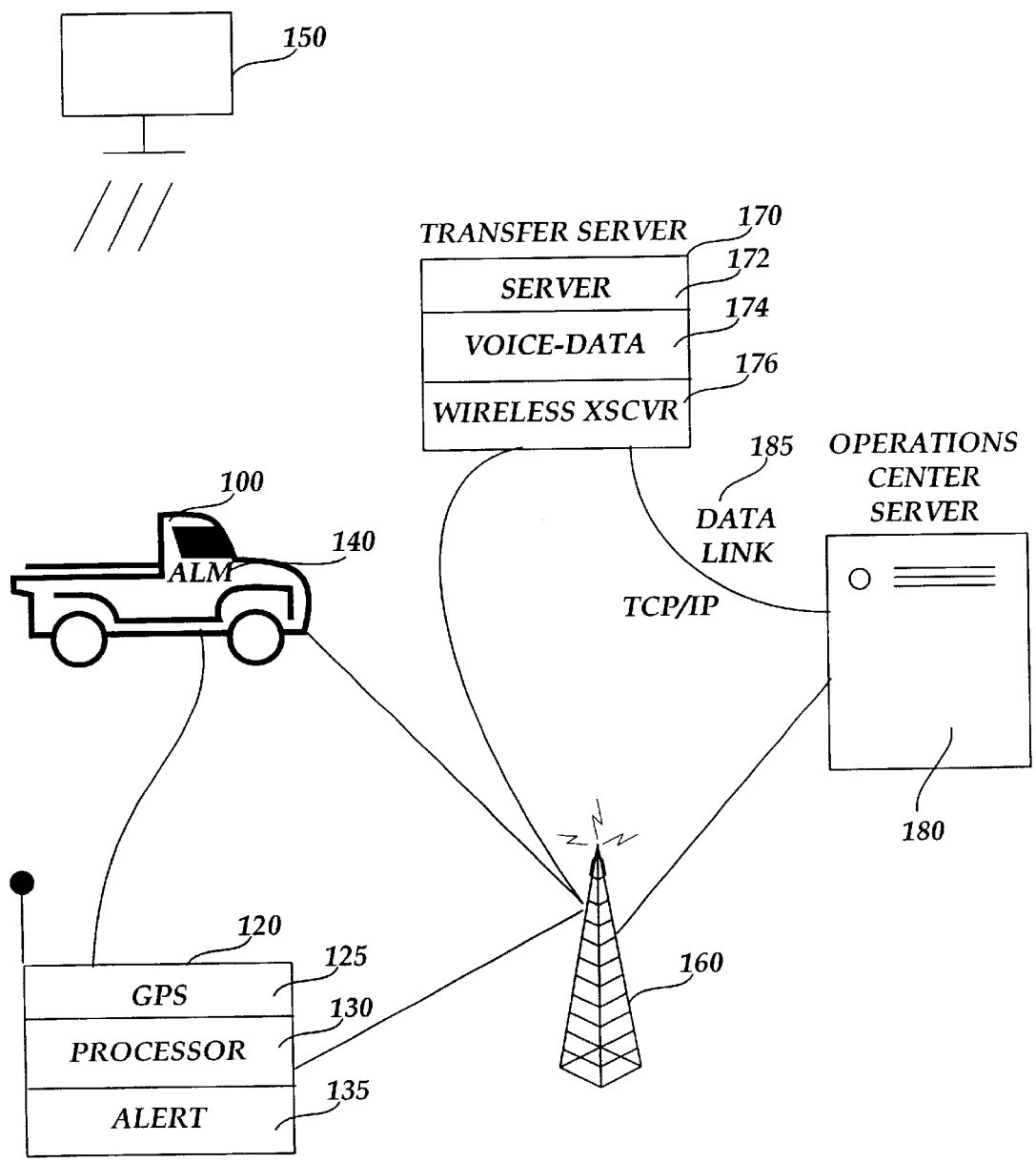
FIG. 1 is a block diagram representing a general system architecture for the present invention.

FIG. 1 is a block diagram representing a general system architecture for the present invention. A vehicle 100 is shown illustrating a vehicle or equipment item in which an equipment or system installation must be performed by an equipment installer. As shown in FIG. 1, a remote monitoring device 120 is illustrated for installation into the vehicle 100 by an equipment installer. The remote monitoring system 120 includes a global positioning satellite system receiver 125 for receiving location, speed, direction and timing data from a GPS satellite system 150. The remote monitoring system 120 includes a processor 130 and an alert transmitter 135. According to an embodiment of the present invention, the alert transmitter 135 allows an operator of the vehicle or equipment 100 to transmit an alert from the remote monitoring system 120 via a wireless telecommunications system 160 to an operations center server 180 to notify operations personnel that the operator of the vehicle 100 or equipment 100 is in distress.

The remote monitoring device 120 is illustrative of any device or equipment that is installed in a vehicle or equipment item by an equipment installer for which identification data and setup information must be transmitted to an operations center server 180 to properly associate the device with the vehicle or equipment item 100 to which it is attached or associated. For a detailed description of remote monitoring devices, such as the remote monitoring device 120, see United States Patent Application entitled "Monitoring System for Persons, Vehicles, Equipment and Miscellaneous Items," filed Jun. 28, 2002 and assigned application Ser. No. 10/185,301, which is incorporated herein by reference as if fully set out herein.

Referring still to FIG. 1, a transfer server 170 is provided for transferring data between the equipment installer and the operations center server 180. The transfer server 170 includes a server system 172 which is illustrative of a computer or collection of computers for including software and memory capacity for receiving, processing, and transmitting data between the equipment installer at the equipment or vehicle 100 and the operations center server 180. A wireless transceiver 176 is included at the transfer server 170 for receiving incoming wireless communications from an equipment installer initiated from a wireless telecommunications device, such as a wireless telephone, operated by the equipment installer. The wireless transceiver 176 is illustrative of wireless transceivers operated in common wireless telecommunications systems for receiving and transmitting wireless communications.

A voice-to-data software application 174 is provided at the transfer server 170. According to an embodiment of the present invention, a two-way communication is set up between the equipment installer and the operations center server 180 for the transmission of installation data from the vehicle or equipment 100 to and from the operations center server 180. It is advantageous to allow the equipment installer to transmit installation data to the operations center server via voice communication using a wireless telephone because equipment installers are often in remote areas installing equipment in a vehicle or piece of equipment 100 where the only the access to the operations center is via voice communication using a wireless telephone. However, if desired, the voice communication from the equipment installer to the transfer server can be made over a wireline telecommunications system.

According to the present invention, the voice-to-data software application 174 receives voice communications from the equipment installer via the wireless transceiver 176. The voice communication is converted to data, and the data is transmitted to the operations center server via a data link 185. The data link 185 may be operated according to a variety of protocols for transferring data, including TCP/IP protocol. Once the operations center server receives data from the transfer server responsive data sent from the operations center server back to the equipment installer is intercepted by the transfer server and is converted from data to voice, and a synthesized voice message is then transmitted to the equipment installer via the wireless transceiver 176. Accordingly, a two-way communication is conducted between a human equipment installer utilizing voice communication and a computing system at the operations center server utilizing data communication.

The operations center server is illustrative of a computer or collection of computers for obtaining, storing, manipulating and maintaining data on a variety of systems over which the operations center server maintains control. For example, the operations center server may operate in a telecommunications system and may be tasked with maintaining data on a fleet of maintenance vehicles operated by the telecommunications system for installing and maintaining equipment over a wide geographic area. According to an embodiment of the present invention, some communications may be conducted directly between the equipment or vehicle 100 and the operations center server. For example, an alarm system 140 may be included in the vehicle or equipment 100 for activating an alarm that is transmitted directly from the monitoring device 120 to the operations center server to notify operations center personnel that an operator of the equipment or vehicle 100 is in distress. When an equipment installer initiates the two-way communication, described above, for installing equipment at a vehicle or equipment site 100, the equipment installer may test an alarm such as the alarm system 140, during the two-way communication. Accordingly, an alarm test transmitted from the monitoring device 120 to the operations center server 180 is detected to the server 180, and a response may be sent back to the equipment installer via the transfer server 170 to notify the equipment installer via voice over the installer's wireless telephone that the alarm test was successful or unsuccessful.

Figure 2:
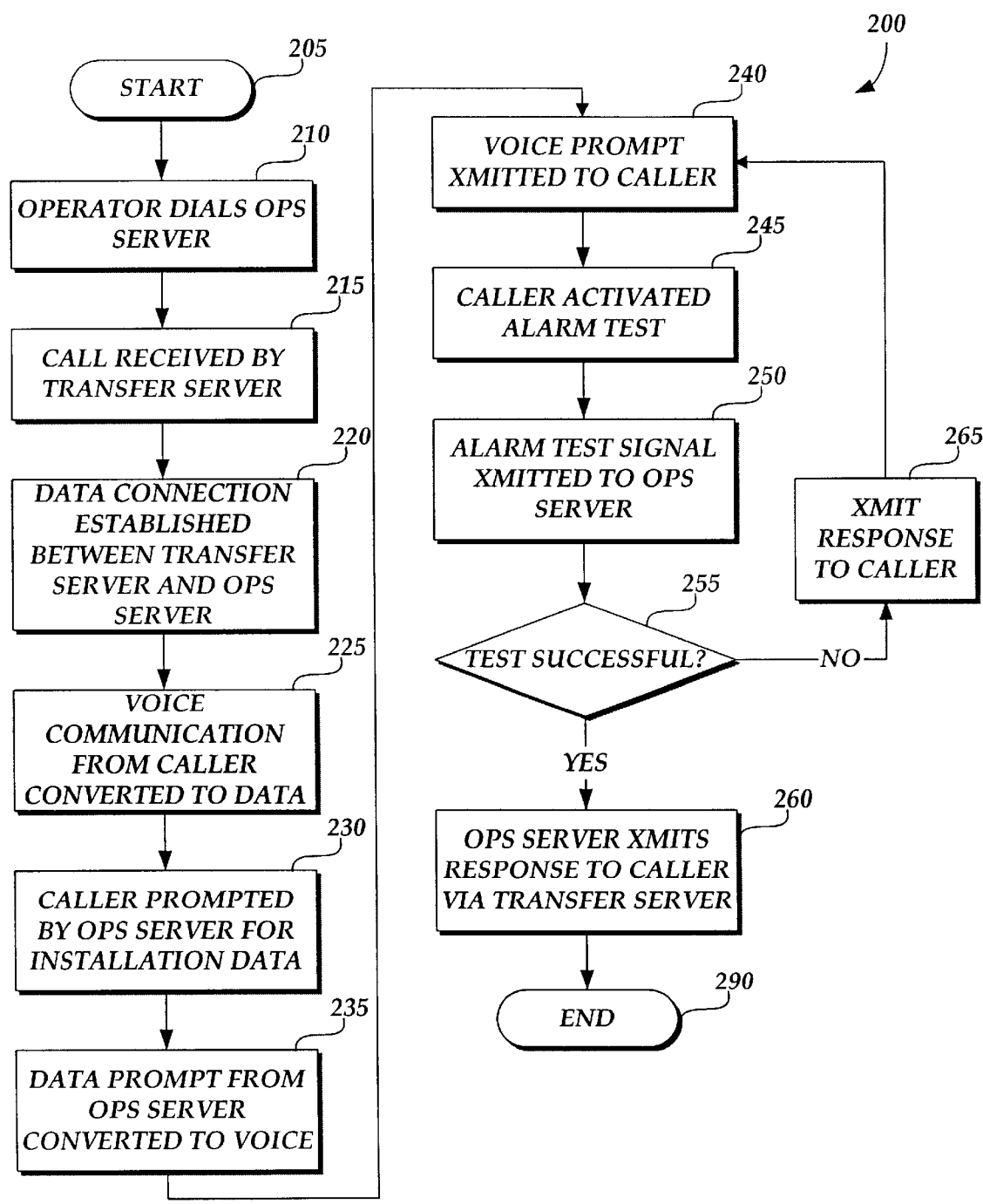
FIG. 2 illustrates an operational flow of the steps performed by a system and method of the present invention for transmitting equipment installation data between an equipment installer and an operations center server according to an embodiment of the present invention.

FIG. 2 illustrates an operational flow of the steps performed by a system and method of the present invention for transmitting equipment installation data between an equipment installer and an operations center server according to an embodiment of the present invention. For purposes of the following description, assume, for example, that an equipment installer operating in a telecommunications service system is tasked with installing a GPS-based remote monitoring system in a fleet of maintenance vehicles operated by the telecommunications service provider.

The method 200 begins at start step 205 and proceeds to step 210 where the equipment installer utilizing his wireless telephone dials the operations center server 180 to provide the server with installation information for the equipment being installed. For example, in order for the operations center server to properly associate future incoming data from the monitoring device 120 with the vehicle 100 into which it is being installed, an identification code for the monitoring device 120 and an identification code for the vehicle 100 must be provided to the operations center server. Additionally, if the vehicle 100 is assigned to a designated operator who will operate the vehicle or equipment after the equipment installation is completed, an identification code for the designated operator may also be sent to the operations center server for association with the monitoring device and vehicle. If the equipment installer is installing an alarm system 140 in the vehicle, the equipment installer may need to test the alarm system 140 to ensure that the alarm system is operational.

At step 215, the wireless call initiated by the equipment installer is transmitted from the installer's wireless telephone via the wireless telecommunications system 160 to the wireless transceiver 176 at the transfer server 170. At the transfer server 170, a determination is made that the wireless call is directed to the operations center server for transmitting data to the operations center server. Accordingly, a data connection is established between the transfer server and the operations center server via the data link 185. At step 225, voice communication from the equipment installer is converted from voice to data and is transmitted to the operations center server. For example, the equipment installer may begin the communication with the operations center server by stating, "This is Installer #1234 ready to install equipment in a maintenance vehicle." The communication from the equipment installer is converted to data by the voice-to-data software 174 and is transmitted via the data link 185 to the operations center server 180. Once the operations center server 180 receives the communication, a determination is made that an equipment installation is in progress. In response, at step 230, a series of prompts are forwarded from the operations center server to the equipment installer via the transfer server 170. For example, the operations center server may send a prompt via data to the transfer server 170 such as, "Please enter the vehicle identification code."

At step 235, the data communication from the operations center server is converted from data to voice by the voice-to-data software application 174. At step 240, the voice communication is transmitted via the wireless transceiver 176 to the equipment installer via the equipment installer's wireless telephone. The equipment installer may then respond to the prompt with a voice response such as, "The vehicle identification number is 12345." The voice response from the equipment installer is transmitted via the wireless transceiver 176 to the transfer server 170, where the voice communication is converted to data and is then transmitted to the operations center server 180 via the data link 185. This two-way, voice-to-data communication between the equipment installer at the vehicle 100 and the operations center server 180 is continued until all required equipment installation and set-up data is received by the operations center server 180.

At step 245, the equipment installer activates an alarm at the alarm system 140 in the vehicle 100 to test operation of the alarm system 140. As should be understood, prior to activating the alarm system 140, the operations center server 180 may send a prompt to the equipment installer requiring the equipment installer to test the alarm system 140. Accordingly, the operations center server 180 will know that the alarm signal received from the alarm system 140 is a test alarm. At step 250, an alarm signal is transmitted from the monitoring device 120 via the wireless telecommunication system 160 directly to the operations center server 180. As should be understood, the alarm test may be performed during the same two-way communication established above for providing equipment installation data to the operations center server.

When the alarm signal is transmitted from the alarm system 140 to the operations center server 180 via the monitoring device 120, the data associated with the signal includes an identification code for the vehicle or equipment 100 as previously initialized by the equipment installer. Accordingly, the operations center server knows the identity of the vehicle 100 from which the alarm signal is received. As step 255, a determination is made at the operations center server as to whether the alarm test is successful. According to one embodiment, if the alarm signal is not received by the operations center server within a set amount of time after prompting the equipment installer to activate the alarm system 140, the operations center server 180 will designate the test as unsuccessful.

If the test is not successful, the method proceeds to step 265 and a responsive message is transmitted from the operations center server 180 to the equipment installer via the transfer server 170. The equipment installer receives a voice communication converted from the data transmitted by the operations center server that the alarm test is unsuccessful, and the equipment installer is prompted to test the alarm system 140 again. If the alarm system test is detected by the operations center server 180 and a determination is made that the alarm test is successful, the method proceeds to step 260, and the operations center server transmits a message to the equipment installer via the transfer server 170 that the alarm system test is successful. Once the equipment installer receives the voice prompt from the transfer server 170 that the alarm test is successful, the equipment installer awaits prompts from the operations center server 180 requiring additional information or testing from the equipment installer. If all information and testing is completed, a final prompt may be received from the operations center server such as, "Equipment installation is complete." The method ends at step 290.

As described herein, a method and system are provided for transmitting equipment installation data between an equipment installer and an operations center server. It will be appreciated by those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method of providing equipment installation data and testing from a remote equipment installation site, comprising the steps of:

sending a voice call from the remote equipment installation site to an operations center server;

receiving the call at a transfer server;

at the transfer server, establishing a data connection between the transfer server and the operations center server;

converting the voice call to a data call;

sending the data call to the operations center server;

in response to receipt of the data call at the operation center server, sending a data response from the operation center server to the remote installation site;

receiving the data response at the transfer server;

at the transfer server, converting the data response from the operations center server to a voice response; and sending the voice response to the remote installation site.

2. The method of claim 1, whereby the step of sending a voice call from the remote equipment installation site includes sending the voice call via a wireless telecommunications system.

3. The method of claim 1, whereby the step of sending the voice call from the remote equipment installation site includes sending the voice call via the wireline telecommunications system.

4. The method of claim 1, whereby the step of establishing a data connection between the transfer server and the operations center server includes maintaining a voice communication link between the transfer server and the remote installation site while establishing the data connection between the transfer server and the operation center.

5. The method of claim 1, whereby the step of converting the voice call to a data call includes sending the voice call to a voice-to-data conversion application for converting the voice call to a data call.

6. The method of claim 5 further comprising the steps of:
   establishing a two-way communication between the operations center server and the remote installation site via the transfer server;
   whereby a first leg of the two-way communication between the remote installation site and the transfer server is a voice communication; and
   whereby a second leg of the two-way communication between the transfer server and the operation center server is a data communication.

7. The method of claim 6, whereby the step of sending a data response from the operations center server to the remote installation site includes sending the data response from the operations center server to the remote installation site via a data link.

8. The method of claim 6, whereby the step of sending a data response from the operations center server to the remote installation site includes prompting an equipment installer at the remote equipment installation site to provide equipment installation information to the operations center server.

9. The method of claim 8, whereby the step of prompting an equipment installer at the remote equipment installation site includes prompting the equipment installer for an equipment identification code for a piece of equipment to be installed at the remote equipment installation site.

10. The method of claim 9, whereby the step of prompting an equipment installer at the remote equipment installation site includes prompting the equipment installer for an equipment operator identification code associated with the piece of equipment.

11. The method of claim 8, whereby the step of prompting an equipment installer at the remote equipment installation site includes the step of:
    during the two-way communication, sending from the remote equipment installation site, the equipment installation information in response to prompts from the operation center server.

12. The method of claim 6, further comprising the steps of:
    during the two-way communication, activating an alarm test at the remote equipment installation site;
    receiving an indication of the alarm test at the operation center server; and
    sending a response from the operation center server indicating whether the alarm test is successful.

13. The method of claim 12, whereby the step of activating an alarm test at the remote equipment installation site includes:
    sending an alarm test signal from the remote equipment installation site to the operations center server;
    sending a response from the operations center server indicating whether the alarm test is successful includes sending the response via the transfer server and converting the response from data to voice; and
    sending the voice response to an equipment installer from the transfer server indicating whether the alarm test is successful at the remote equipment installation site.

14. The method of claim 1, whereby an equipment associated with the equipment installation information includes a remote monitoring device installed at the remote equipment installation site operated remotely from the operations center server.

15. The method of claim 14, whereby the remote equipment installation site is a vehicle.

16. The method of claim 14, whereby the remote equipment installation site is a piece of equipment.

17. The method of claim 1, whereby an equipment associated with the equipment installation information includes an alarm system installed on a piece of equipment operated remotely from the operations center server.

18. A system for providing equipment installation data and testing from a remote equipment installation site, comprising:
    a wireless transceiver operative to send a voice call from the remote equipment installation site to an operations center server;
    a transfer server operative
        to receive the call;
        to establish a data connection between the transfer server and the operations center server;
        to operate a voice-to-data conversion application to convert the voice call to a data call;
        to send the data call to the operations center server;
        to receive a data response from the operations center server;
        to convert the data response from the operations center server to a voice response; and
        to send the voice response to the remote installation site.

19. The system of claim 18, whereby the transfer server is further operative to establish a data connection between the transfer server and the operations center server while maintaining a voice communication link between the transfer server and the remote installation site.

20. The system of claim 19, whereby the operations center server is operative to prompt an equipment installer at the remote equipment installation site via the transfer server to provide equipment installation information to the operations center server.

21. The system of claim 20, whereby the operations center server is further operative
    to receive an indication of an alarm test activated at the remote equipment installation site; and
    to send an alarm test response from the operations center server indicating whether the alarm test is successful; and
    the transfer server is further operative
        to receive the alarm test response from the operations center server;
        to convert the alarm test response from data to voice; and
        to send the voice response to an equipment installer at the remote equipment installation site.

22. The system of claim 18, whereby the remote equipment installation site is a vehicle.

23. The method of claim 18, whereby the remote equipment installation site is a piece of equipment.

* * * * *